June 2, 1931. G. L. SMITH 1,808,121
BRAKE APPLYING MECHANISM
Filed Sept. 28, 1928 2 Sheets-Sheet 2
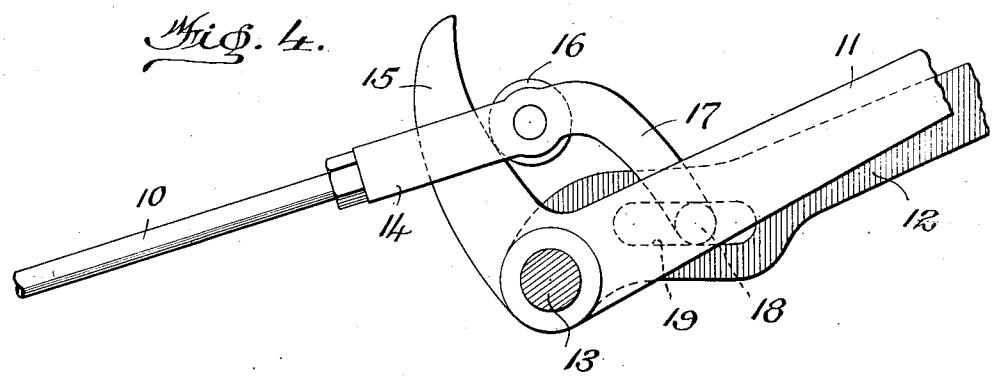
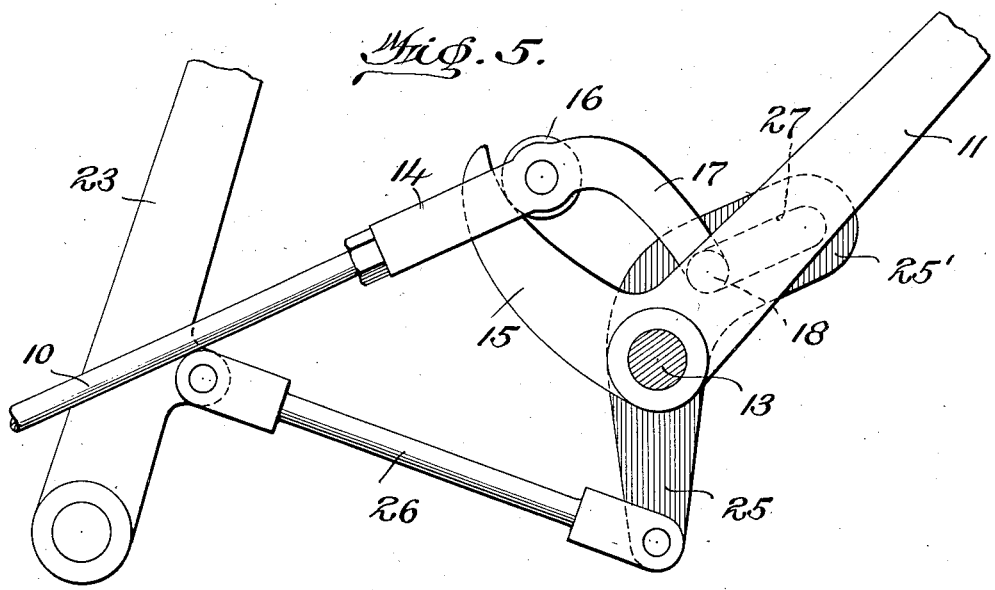
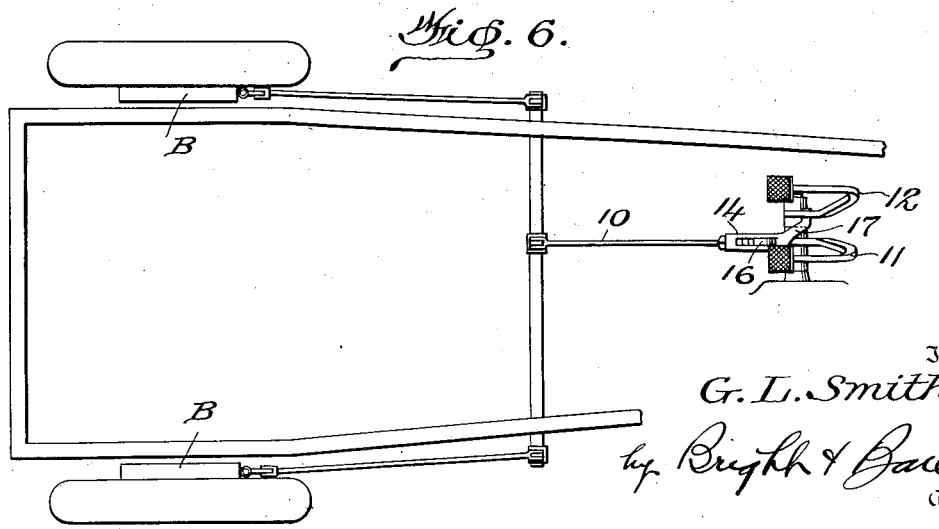
Inventor
G. L. Smith,
by Bright & Bailey
Attorneys Patented June 2, 1931

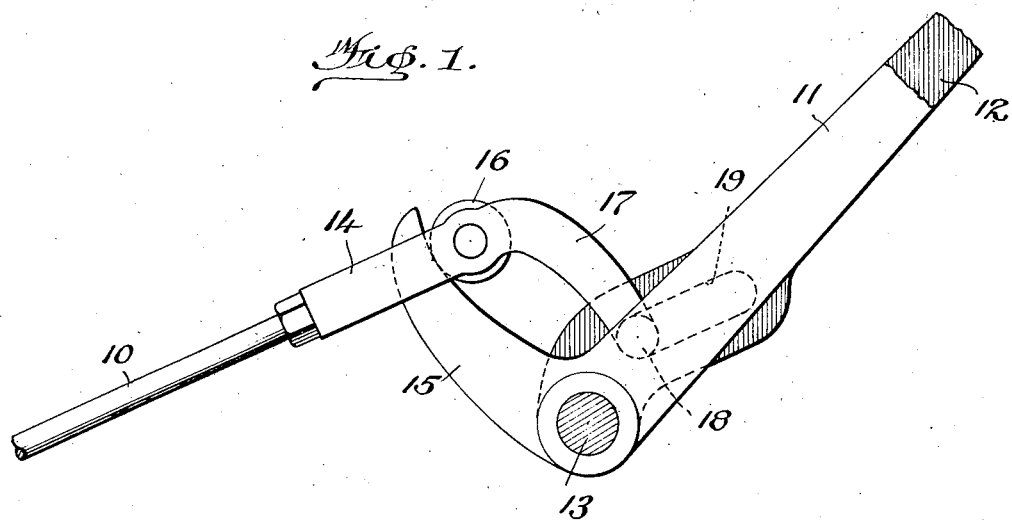
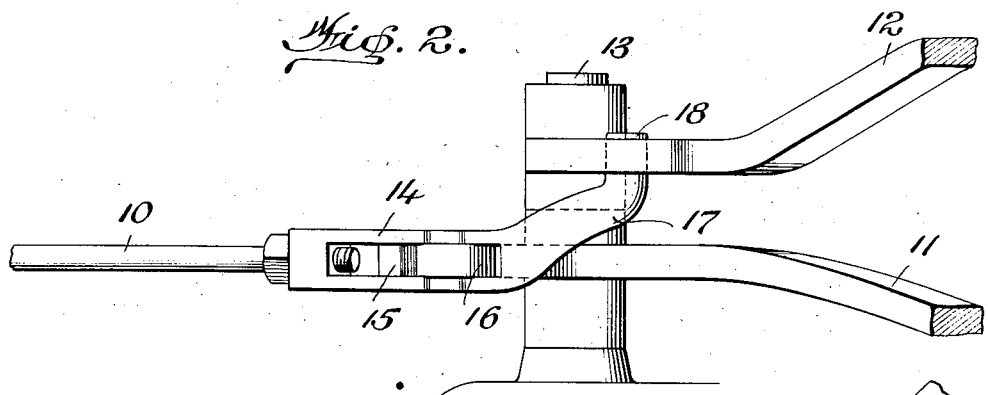
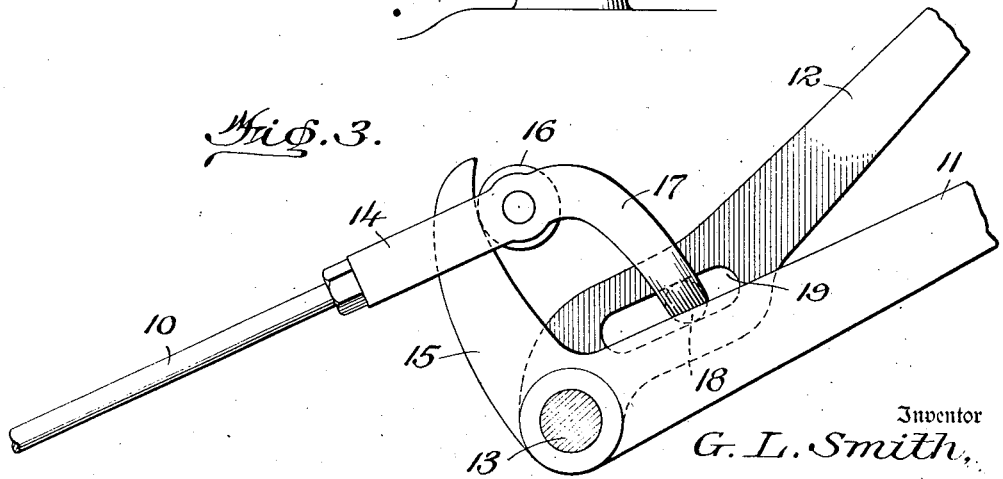

1,808,121

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE-APPLYING MECHANISM

Application filed September 28, 1928. Serial No. 309,057.

My invention relates to brake applying mechanism for vehicle brakes.

Except in the case of light automobiles it is very difficult to get a mechanical advantage, or leverage, sufficient to stop the car quickly, without reducing the brake clearance when brakes are off to such an extent that they drag. Most automobiles have a clutch operating lever and a brake applying lever each operated by a foot pedal, and it is the object of my invention to utilize both of said levers in setting the brakes and without interfering in any way with the normal functioning of the mechanism controlled by either lever. I therefore employ the brake lever to apply the brakes in the usual way, but do not increase the leverage more than can be done without reducing the normal running clearance of the brakes, and I employ the clutch operating lever to increase the leverage of the brake lever, either before or after brakes are applied, so that the brake pressure is intensified to the desired amount. Furthermore, my improved construction produces this change of leverage without involving any extensive change in the position of the brake lever or any appreciable increase in foot pressure thereon.

This construction as above outlined provides the operator of the vehicle with a brake system of moderate power operated and controlled through the brake lever only. Where sudden stops are necessary requiring greater brake pressure than the maximum to be obtained from brake lever alone, the operator actuates the clutch lever before or after depression of the brake pedal, as he may elect, and thereby increases his brake leverage to the desired amount. In my alternate construction the same principles of operation are utilized except that the intensifying action is accomplished through the emergency brake lever instead of the clutch operating lever.

In the drawings chosen to illustrate my invention, the scope whereof is set forth in the appended claims—

Figure 1 is a side elevation of my improved brake applying mechanism with both the brake applying lever and clutch operating lever shown in their normal positions;

Figure 2, a plan view of Figure 1;

Figure 3, a view similar to Figure 1 with the clutch operating lever in normal position and the brake applying lever moved in a brake applying direction;

Figure 4, a view similar to Figure 1 with the brake applying lever moved in a brake applying direction and the clutch applying lever moved in clutch disengaging direction;

Figure 5, a side elevation of a modified form of my invention wherein the emergency brake lever of an automobile is utilized to intensify the braking force in lieu of the clutch operating lever; and Figure 6, a fragmental plan view showing the complete application of my invention to a motor vehicle.

Referring to the drawings, 10 represents a brake operating rod which forms a part of the connections between the foot operated brake applying lever 11 and the brakes B, the pivotal bearing of said lever being indicated at 13. 12 represents the clutch operating lever which is also mounted on the bearing 13. A clevis 14 is attached to the rod 10 through which the toe 15 of the brake applying lever 11 extends. A roller 16 carried by the clevis 14 is in rolling engagement with the forward edge of the toe 15. An arm 17 projects forwardly from the clevis 14 and terminates in a pin 18 extending into a groove or slot 19 in the clutch operating lever 12. This groove or slot extends substantially parallel to the rod 10 so that this rod, when moved by the brake applying lever 11, will remain at a fixed distance from the bearing 13.

When the clutch lever is operated from the position shown in Figure 3 to the position shown in Figure 4, the pin 18 will be moved downwardly and the clevis 14 will be drawn towards the bearing 13 and as the roller 16 shifts along the edge of the toe 15 toward the bearing 13 it pulls the rod 10 forward by an amount depending upon the slope of said edge.

With the brake applying lever in normal position, as shown in Figure 1, movement of clutch operating lever will not cause any serious movement of rod 10 since the pin 18 is, under these conditions, relatively near the bearing 13.

In my alternate construction I connect the emergency brake lever 23 of an automobile to a rocker 25 by means of a link 26. This rocker 25 has a toe or extension 25' provided with a grove 27 corresponding to to the groove 18 in the clutch operating lever previously referred to, so that the emergency lever 23 will operate to increase the brake leverage.

From the above description it is readily seen that the brake applying lever normally operates the brake rod with a fixed leverage, since the distance from bearing 13 to rod 10 is maintained substantially a constant. When the clutch operating lever or the emergency brake lever is actuated the effective length of the toe 15 is shortened by a lateral movement of rod 10, clevis 14 and roller 16 towards the pivot 13 with the result that the brake applying force is then transmitted through an increased leverage.

While my invention is primarily adapted for incorporation in the brake systems of motor vehicles and is disclosed so applied, it will be apparent that the same can be utilized in any brake system where it may be desirable to intensify the brake applying force beyond that obtainable by the operation of the brake applying lever, without in any manner departing from the scope of my invention as set forth in the appended claims.

I claim:

1. In a brake applying mechanism, a brake, a lever, connections between the brake and lever including a pull rod having a shiftable connection with the lever for movement along the latter toward and away from its pivot, a second lever, and means operable by the second lever to shift said connection along the first named lever.

2. In a brake mechanism, a brake, a brake applying lever having a fixed fulcrum, a shiftable connection between said lever and brake, a second lever, each of said levers being independently movable, and means operable by movement of the second lever to vary the location of the point of engagement of said connection along the brake lever.

3. In a brake mechanism, a brake, a brake applying lever, a shiftable connection between the lever and brake, and a second lever, said levers being pivoted on a common axis and each being independently movable, and means operable by movement of the second lever to vary the location of the point of engagement of said connection along the brake lever.

4. In a brake mechanism, a brake, a brake applying lever, a shiftable connection between the lever and the brake, a second lever, said levers being pivoted on a common axis, and means operable by movement of the second lever to vary the location of the point of engagement of said connection along the brake lever.

5. In a brake mechanism, a brake, a brake applying lever having a fixed fulcrum dividing the lever into power and work arms, a shiftable connection between the work arm of said lever and the brake, and a second lever, each of said levers being independently movable, and means operable by movement of the second lever to vary the location of the point of engagement of said connection along the work arm of the lever.

6. In a brake mechanism, a brake, a brake applying lever having a fixed fulcrum dividing said lever into power and work arms, a shiftable connection between the work arm of said lever and the brake, a second lever, each of said levers being independently movable, and means operable by movement of the second lever to vary the location of the point of engagement of said connection along the work arm of said brake lever.

7. In a brake applying mechanism, a brake, a pivoted brake lever, a brake rod between the brake and lever having a connection with the latter which is movable toward and away from the pivot of the lever, a second pivoted lever having a slot, and an arm extending from said brake rod and engaging said slot.

8. In a brake applying mechanism, a brake, a pivoted brake lever, a brake rod between the brake and lever having a connection with the latter which is movable toward and away from the pivot of the lever, a second pivoted lever having a slot, and an arm extending from said brake rod and engaging the slot, said slot being parallel to the brake rod.

In testimony whereof I hereunto affix my signature.

GEORGE L. SMITH.